United States Patent

Fukuda

Patent Number: 6,115,612
Date of Patent: *Sep. 5, 2000

[54] WIRELESS TELEPHONE SYSTEM HAVING A FREE PERIOD ALLOCATED TO SWITCHING BETWEEN TWO FREQUENCIES

[75] Inventor: Kunio Fukuda, Tokyo, Japan

[73] Assignee: Sony Corporation, Tokyo, Japan

[*] Notice: This patent is subject to a terminal disclaimer.

[21] Appl. No.: 08/879,794

[22] Filed: Jun. 20, 1997

[30] Foreign Application Priority Data

Jun. 25, 1996 [JP] Japan .................................. 8-184179

[51] Int. Cl.⁷ ...................................................... H04Q 7/20
[52] U.S. Cl. .......................................... 455/517; 455/38.3
[58] Field of Search .................... 455/517, 38.3, 455/422, 462, 465, 403; 370/347, 348

[56] References Cited

U.S. PATENT DOCUMENTS

| | | | |
|---|---|---|---|
| 5,515,366 | 5/1996 | Chieu et al. | 370/348 |
| 5,636,243 | 6/1997 | Tanaka | 455/38.3 |
| 5,771,463 | 6/1998 | Lehmusto et al. | 455/509 |

FOREIGN PATENT DOCUMENTS

WO 94/05101  3/1994  WIPO.

*Primary Examiner*—Dwayne D. Bost
*Assistant Examiner*—Myron K. Wyche
*Attorney, Agent, or Firm*—Jay H. Maioli

[57] ABSTRACT

A wireless-phone system makes it possible to simplify a radio section of the base station for relaying the predetermined data sent from a mobile wireless terminal by means of a first frequency, and for transmitting/receiving the control data to mobile wireless terminals which are in a reception waiting state by means of a second frequency. A first data sent from a first mobile wireless terminal, out of the bi-directional communications between the first and second mobile wireless terminals, is relayed at a base station to transmit it to the second mobile wireless terminal, and a second data sent from the second mobile wireless terminal is directly transmitted to the first mobile wireless terminal. Thereby, the base station is able to ensure a free period which is allocated to switching of the oscillation frequency of the frequency-selecting oscillators, and to transmission and reception of the control data by the use of the second frequency.

8 Claims, 6 Drawing Sheets

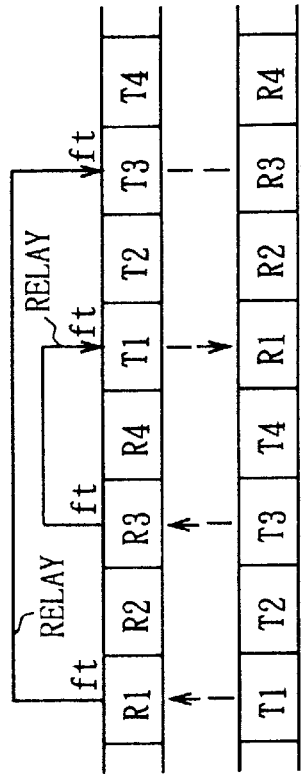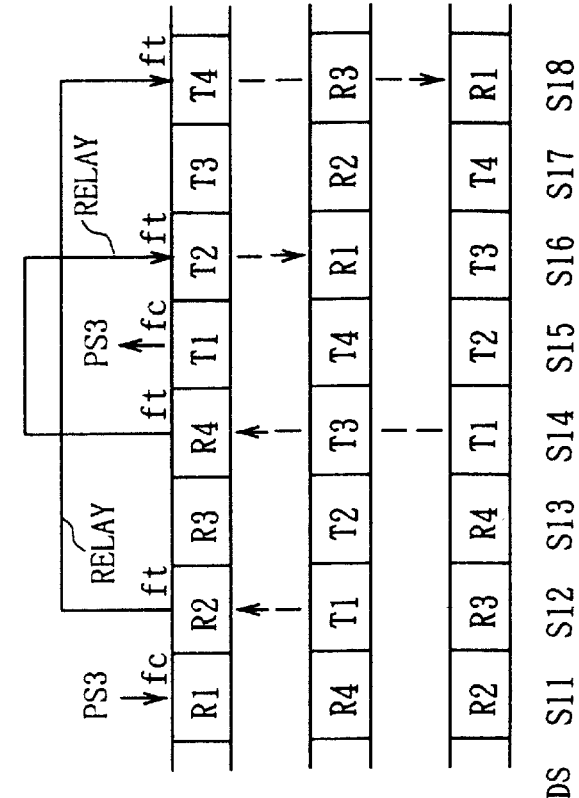
FIG. 1A (RELATED ART)
FIG. 1B (RELATED ART)
FIG. 1C (RELATED ART)
FIG. 2A (RELATED ART)
FIG. 2B (RELATED ART)
FIG. 2C (RELATED ART)

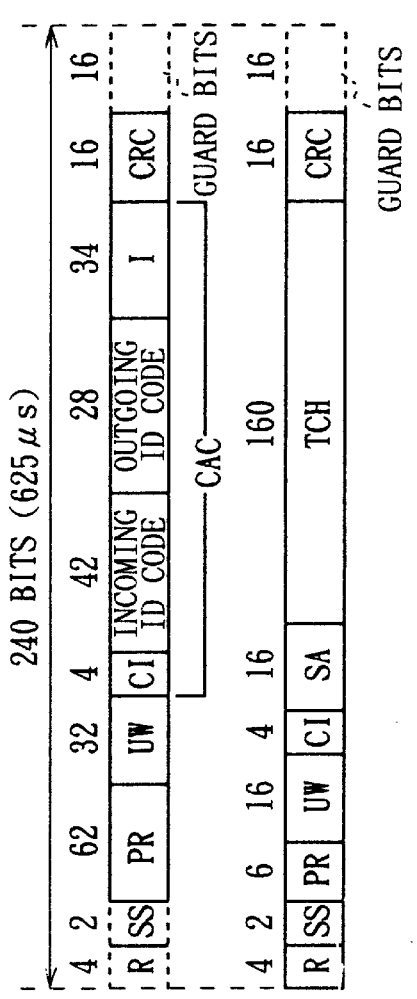
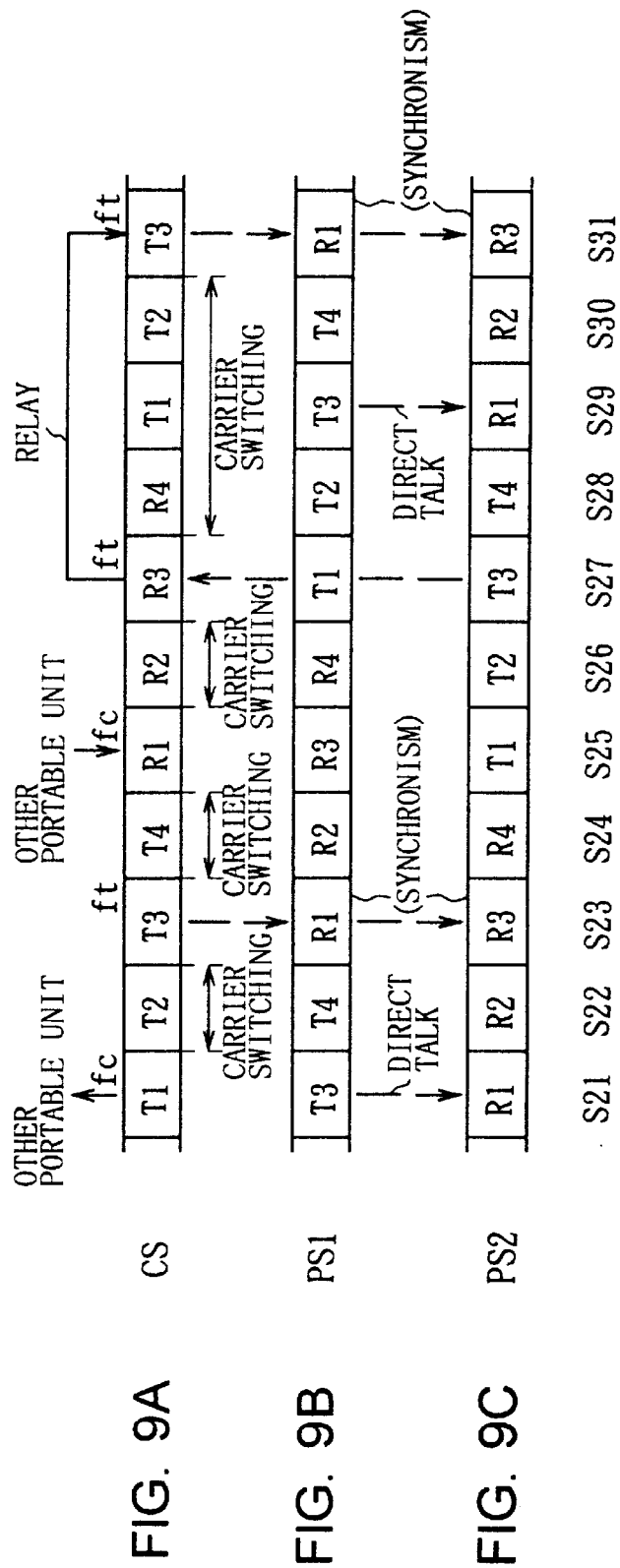
FIG. 8A
FIG. 8B
FIG. 9A
FIG. 9B
FIG. 9C

WIRELESS TELEPHONE SYSTEM HAVING A FREE PERIOD ALLOCATED TO SWITCHING BETWEEN TWO FREQUENCIES

BACKGROUND OF THE INVENTION

1. Field of the Invention

This invention relates to a wireless telephone system, and more particularly, is applicable to a digital codeless-phone system in which plural portable units are registered on a base unit to communicate between the base unit and a portable unit or between the portable units.

2. Description of the Related Art

Heretofore, as a digital codeless-phone system of this kind, there is a system of, for instance, a personal handyphone system (PHS) scheme wherein wireless communication is performed between the base unit, which has been connected to a public telephone network by wire, and the portable units or among the portable units, by the use of the time division multiple access (TDMA) scheme. In this digital codeless-phone system of PHS-scheme, intercommunication may be performed among the plural portable units which have been registered on the base unit or between the base unit and the portable units, and communication may be performed between a portable unit and a telephone which has been connected to the public telephone network, so-called line wire.

On the TDMA scheme in the digital codeless-phone system of PHS-scheme, the time base is divided into 5 millisecond [ms] frames. The respective frames are divided into eight time slots in amount, that is, the continuous four transmission time slots and the continuous four reception time slots. The duration of each time slot is 625 millisecond [μs].

By using one transmission time-slot in one frame on the base-unit side and using one reception time-slot on the portable unit side, the PHS-scheme digital codeless-phone system transmits the digital data which is comprised of the physical slots of the stated bit number from the base unit to the portable unit through a certain frequency. Besides, by using one transmission time-slot in one frame on the portable unit side and using one reception time-slot on the base-unit side, the PHS-scheme digital codeless-phone system transmits the digital data which is comprised of the physical slots of the stated bit number from the portable unit to the base unit through the same frequency as the above-mentioned frequency.

The PHS-scheme digital codeless-phone system causes the portable units which are in a reception waiting state to intermittently receive only the control data transmitted from the base unit, so that the power dissipation of the portable units of this state is decreased. That is, the base unit transmits the control data to the respective portable units, using 625 [μs] for each 5 [ms], that is, using one time slot for each two-hundred time slots. At this time, the base unit transmits the control data intermittently by the use of a dedicated frequency (hereinafter, this is referred to as a control carrier).

On the other hand, the respective portable units which are in the reception waiting state receive only the control data which has been transmitted using the control carrier, once for each stated period, for instance, once for every one or two seconds.

When a request to connect has occurred, the base unit transmits the individual number of a called-side portable unit by means of the control data, so as to call up the portable unit which has this individual number within one or two seconds. After the portable unit has been called up, the base unit discriminates the contents of the connection request, such as a calling or reception to the line wire, an intercommunication with the base unit, and an intercommunication with the other portable unit, and then assigns a time slot for transmission/reception of the voice data, and an arbitrary frequency (hereinafter, this is referred to as a communication carrier) excepting the frequency for a direct talk between portable units and that portable unit.

By this, the respective portable units which are in a reception waiting state are not needed to operate in a mode of regular searching of, for instance, ten communication carriers for a direct talk between portable units, and to check whether a call for intercommunication between portable units exists or not. Therefore, the respective portable units receive only the control data which has been transmitted from the base unit through the control carrier, so as to decrease considerably the power dissipation of the time of a reception waiting state in comparison with that of continuous reception, and communicate with the base unit or communicate with a portable unit via the base unit.

Here, as shown in FIGS. 1A to 1C, an explanation is given of such a state that, after the base unit CS which accommodates two time slots has transmitted the control data through the control carrier and assigned the transmitting/receiving time slots and the communication carrier of the frequency ft, the base unit is relaying the speech between the portable units PS1 and PS2, where T1 to T4 are transmission time slots and R1 to R4 are reception time slots. This base unit which accommodates two time slots comprises only one oscillator for selecting frequency (radio channel) in its radio section, and switches the oscillating frequency of this, so as to generate the communication carrier of the arbitrary frequency.

As shown in FIG. 1B, the portable unit PS1 transmits a digital voice data to the base unit CS by the use of the communication carrier of the frequency ft, at the transmission time slot T1 of the period S1. As shown in FIG. 1A, the base unit CS receives this voice data at the reception time slot R1 of the period S1, and then transfers this voice data to the portable unit PS2 at the transmission time slot T3 of the period S7, by the use of the communication carrier of the frequency ft. As shown in FIG. 1C, the portable unit PS2 receives this voice data at the reception time slot R1 of the period S7, and causes the time slot to be synchronized.

On the other hand, the portable unit PS2 transmits a voice data to the base unit CS by the use of the communication carrier of the frequency ft, at the transmission time slot T1 of the period S3. As shown in FIG. 1A, the base unit CS receives this voice data at the reception time slot R3 of the period S3, and then transfers this voice data to the portable unit PS1 at the transmission time slot T1 of the period S5, by the use of the communication carrier of the frequency ft. As shown in FIG. 1B, the portable unit PS1 receives this voice data at the reception time slot R1 of the period S5, and causes the time slot to be synchronized.

In this manner, the portable units PS1 and PS2 perform the mutual delivering and receiving of the respective voice data via the base unit, and cause the time slots to be synchronized, so that a talk between the portable units is performed.

However, in a case that the digital code-less phone system has the other portable unit PS3 in addition to the portable units PS1 and PS2, there has been such a problem that the base unit CS is not able to transmit the control data to the portable unit PS3 by the use of the control carrier whose frequency is different from that of the communication carrier ft, before the talking between the portable unit PS1 and the portable unit PS2 is terminated.

As a result, such a trouble has occurred that the portable unit PS3 which are in a reception waiting state are not able to receive the control data which is utilizing the control carrier from the base unit CS, during the talk between the portable units PS1 and PS2, and they are put out of the speakable zone. Besides, even if a connection request which is based on an outside-line communication, an intercommunication, a door-phone, etc. has occurred, the base unit CS has been not able to inform the portable unit PS3 which is in a reception waiting state that the connection request has occurred.

In order to solve this, it may be considered to transmit the control data by the use of the control carrier during the talk between the portable units, using a base unit CS which accommodates three time slots. That is, as shown in FIG. 2B, the portable unit PS1 transmits a voice data to the base unit CS by the use of the communication carrier of the frequency ft, at the transmission time slot T1 of the period S12. As shown in FIG. 2A, the base unit CS receives this voice data at the reception time slot R2 of the period S12, and then transfers this voice data to the portable unit PS2 by the use of the communication carrier of the frequency ft at the transmission time slot T4 of the period S18. As shown in FIG. 2C, the portable unit PS2 receives this voice data at the reception time slot R1 of the period S18, and causes the time slot to be synchronized.

On the other hand, the portable unit PS2 transmits a voice data to the base unit CS by the use of the communication carrier of the frequency ft, at the transmission time slot T1 of the period S14. As shown in FIG. 2A, the base unit CS receives this voice data at the reception time slot R4 of the period S14, and then transfers this voice data to the portable unit PS1 by the use of the communication carrier of the frequency ft, at the transmission time slot T2 of the period S16. As shown in FIG. 2B, the portable unit PS1 receives this voice data at the reception time slot R1 of the period S16.

As shown in FIG. 2A, in addition to relaying of the voice data of the portable units PS1 and PS2, the base unit CS transmits a control data an a down control-data to the portable unit PS3 by the use of the communication carrier of the frequency fc, at the transmission time slot T1 of the period S15. Besides, at the reception time slot R1 of the period S11, the base unit CS receives an up control-data which has been transmitted from the other portable unit toward the base unit by the use of the control carrier of the frequency fc.

In this connection, the control data is transmitted and received once for each 5 [ms] (25 frames), as stated above.

In this manner, the base unit becomes capable of transmitting/receiving the control data to/from the portable unit PS3, as well as relaying the voice data of the portable units PS1 and PS2, owing to the use of 3 time slots. But, in this state, such pairs of time-slots are produced so that they are neighboring and their frequencies differ from each other, such as the reception time slots R1 and R2, the reception time slot R4 and the transmission time slot T1, and the transmission time slot T1 and the transmission time slot T2.

However, when it is tried to obtain the frequencies fc and ft by switching the oscillation frequency of a single oscillator for frequency selecting, it is hard to ensure the waiting time for stabilization of the frequency after switching. Therefore, as shown in FIG. 3, it has been the only way that a radio section 1 of the abovementioned conventional base unit CS which accommodates 3 time slots is provided with two frequency-selecting oscillators 2 and 3, and these two oscillators 2 and 3 are switched alternately by a VCO switch 4 so as to obtain the frequencies fc and ft. Therefore, such a problem has existed that the constitution of the radio section of the base unit CS is complicated.

In this connection, the frequency-selecting oscillators 2 and 3 have been composed into frequency synthesizers, each of which has a phase locked loop (PLL) 6 and a voltage controlled oscillator (VCO) 5.

SUMMARY OF THE INVENTION

In view of the foregoing, an object of this invention is to provide a wireless telephone system which enables a simple constitution of the radio section of the base station for relaying the predetermined data output from the mobile wireless terminal by means of a first frequency, and for transmitting/receiving the control data to mobile wireless terminals which are in a reception waiting state by means of a second frequency.

The foregoing object and other objects of the invention have been achieved by the provision of a wireless telephone system comprising a base station connected to a public telephone network and plural mobile wireless terminals for communicating with a base station wherein the stated data is communicated among the mobile wireless terminals, when a bi-directional communication is performed between a first mobile wireless terminal and a second mobile wireless terminal out of the plural mobile wireless terminals, the first mobile wireless terminal transmits the first data to the base station, the base station relays the first data transmitted from the first mobile wireless terminal to transmit it to the second mobile wireless terminal, and the second mobile wireless terminal transmits the second data directly to the first mobile wireless terminal.

Among bi-directional communications between the first mobile wireless terminal and the second mobile wireless terminal, the first data output from the first mobile wireless terminal is relayed at the base station to transmit it to the second mobile wireless terminal, and the second data output from the second mobile wireless terminal is transmitted directly to the first mobile wireless terminal, so that the base station is able to ensure a free period which is allocated to switching of the oscillation frequency of the frequency-selecting oscillators, and to transmission/reception of the control data by the use of the second frequency, in addition to the period for transmitting the first data by the use of the first frequency. Accordingly, it is able to simplify the radio section of the base station for relaying the predetermined data output from the mobile wireless terminal by means of a first frequency, and for transmitting/receiving the control data to mobile wireless terminals which are in a reception waiting state by means of a second frequency.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 1A to 1C are timing charts explaining the timing of the transmission and reception at the communication carrier, of the time the portable units talk with each other via the conventional base unit;

FIGS. 2A to 2C are timing charts explaining the timing of the transmission and reception at the communication carrier and the control carrier, at the time the portable units talk with each other via the conventional base unit;

FIGS. 8A and 8B are schematic diagrams showing a constitution of the physical slot for controlling and a constitution of the physical slot for communication; and FIGS. 9A to 9C are timing charts explaining the timing of the transmission and reception, which uses the communication carrier and the control carrier, at the time of bi-directional communication between the portable units via the base unit of the embodiment.

DETAILED DESCRIPTION OF THE EMBODIMENT

Figure 4:
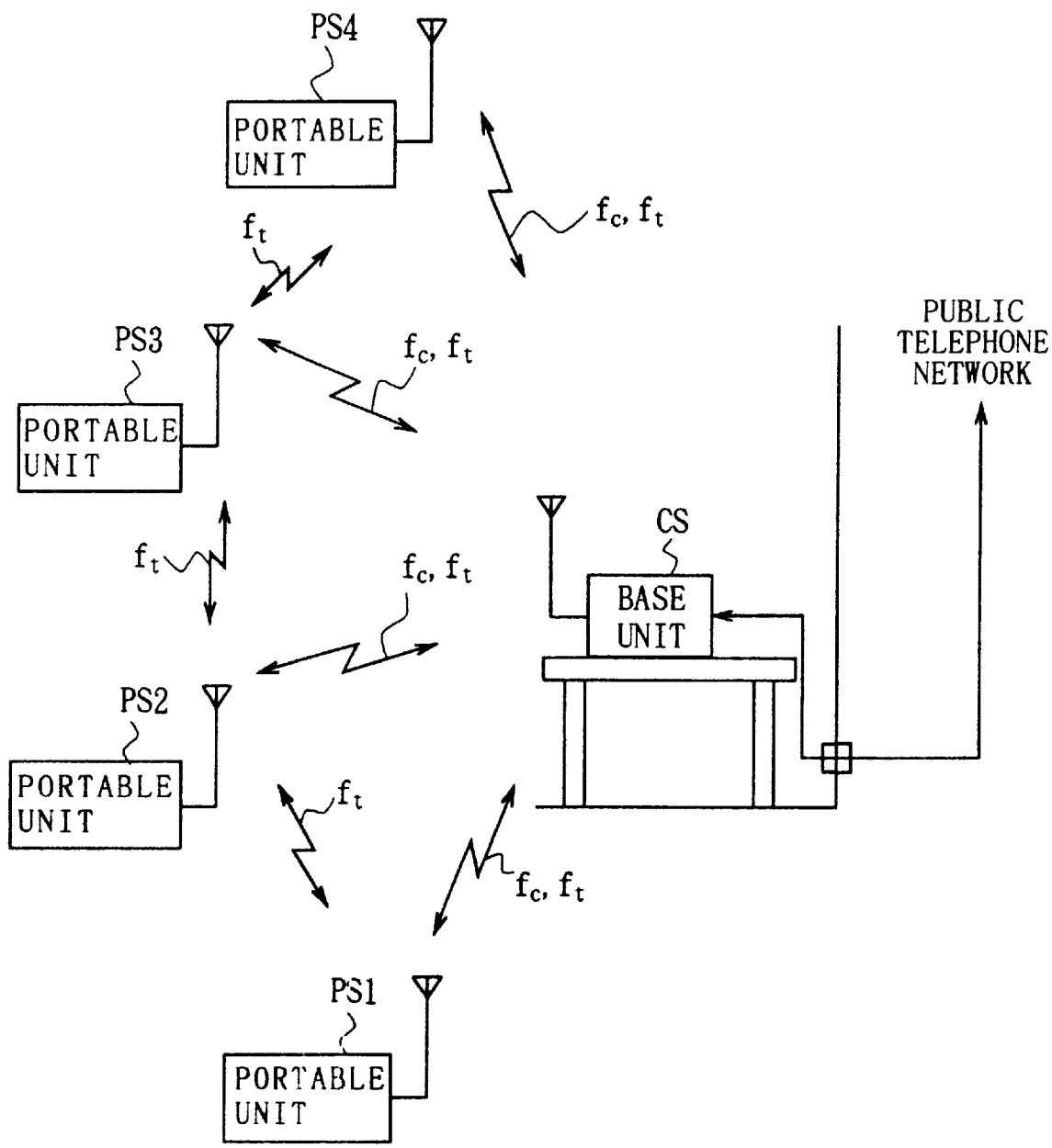
FIG. 4 is a schematic diagram illustrating an embodiment of a wireless telephone system according to the present invention.

Preferred embodiments of this invention will be described with reference to the accompanying drawings:

In FIG. 4, the number 10 generally designates a PHS-scheme digital codeless-phone system which is a wireless telephone system. In the PHS-scheme digital codeless-phone system 10, the base unit CS of PHS-scheme which is a base station is connected to the public telephone network, and the plural portable units PS of PHS system which are mobile wireless terminals are registered on the base unit CS.

The base unit CS relays a voice data of talking between the portable units PS, using the communication carrier of the frequency ft. Besides, the base unit CS transmits/receives the control data intermittently by the use of the control carrier of the frequency fc.

The portable units PS communicates by the use of the communication carrier of the frequency ft which has been assigned with the control data of the base unit CS.

Figure 5:
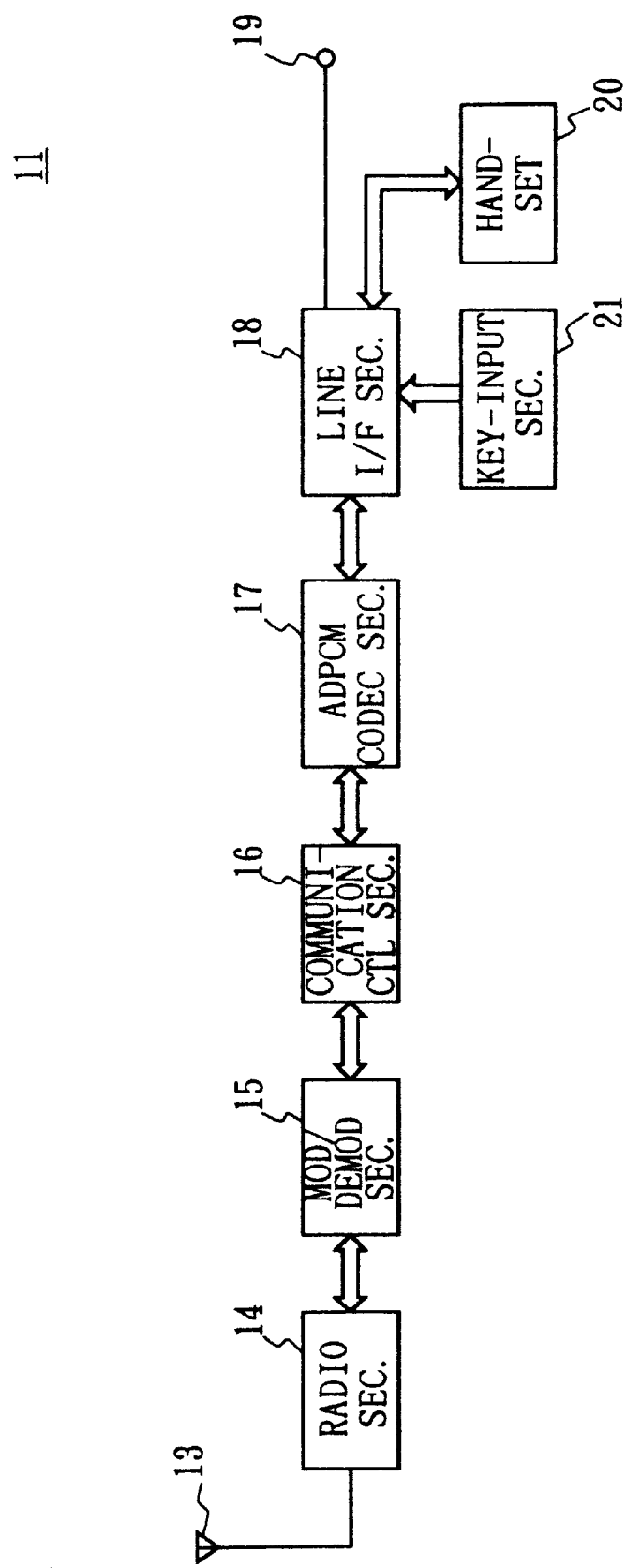
FIG. 5 is a block diagram showing a constitution of a base unit which is used in the PHS-scheme digital codeless-phone system of the embodiment.

As shown in FIG. 5, when a call is issued to the public telephone network from a portable unit PS, the base unit CS performs reception processing of the high-frequency signal which has been obtained by receiving the radio wave transmitted from the portable unit PS with an antenna 13, in a radio section 14, and then supplies it to a modulator and demodulator 15 so as to demodulate the reception data. The modulator and demodulator 15 supplies the demodulated reception data to an adaptive differential pulse code modulation (ADPCM) CODEC section 17, via a communication control section 16. The ADPCM CODEC section 17 produces an analog audio signal from the received ADPCM digital data, and then supplies this audio signal to a line interface section 18. The line interface section 18 issues this audio signal toward the public telephone network, via an analog telephone line connecting terminal 19.

When a signal has been received from the public telephone network, the base unit CS gives the audio signal which has been obtained from the public telephone network to the line interface section 18, via the analog telephone line connecting terminal 19. The line interface section 18 supplies this voice data to the ADPCM CODEC section 17 so as to cause it to convert the data into an ADPCM digital data, and supplies the resulted digital data to the modulator and demodulator 15 via the communication control section 16. The modulator and demodulator 15 produces a modulation signal which is responding to the digital data, and gives the modulation signal to the radio section 14. The radio section 14 modulates the communication carrier of the frequency ft with the modulation signal to produce a modulated signal of high frequency, and then performs a wireless transmission of the modulated signal from the antenna 13.

The base unit CS gives the line interface section 18 an audio signal which has been produced in a hand-set 20 in response to the received voice, along with a control information which have been produced in a key-input section 21 in response to the operation.

The base unit CS is hereby able to deliver the audio signal which is based on the hand-set 20 to the public telephone network via the analog telephone line connecting terminal 19 so as to talk with the other telephone, or able to give it to the ADPCM CODEC section 17 so as to perform inter-communication with the portable units PS.

Figure 3:
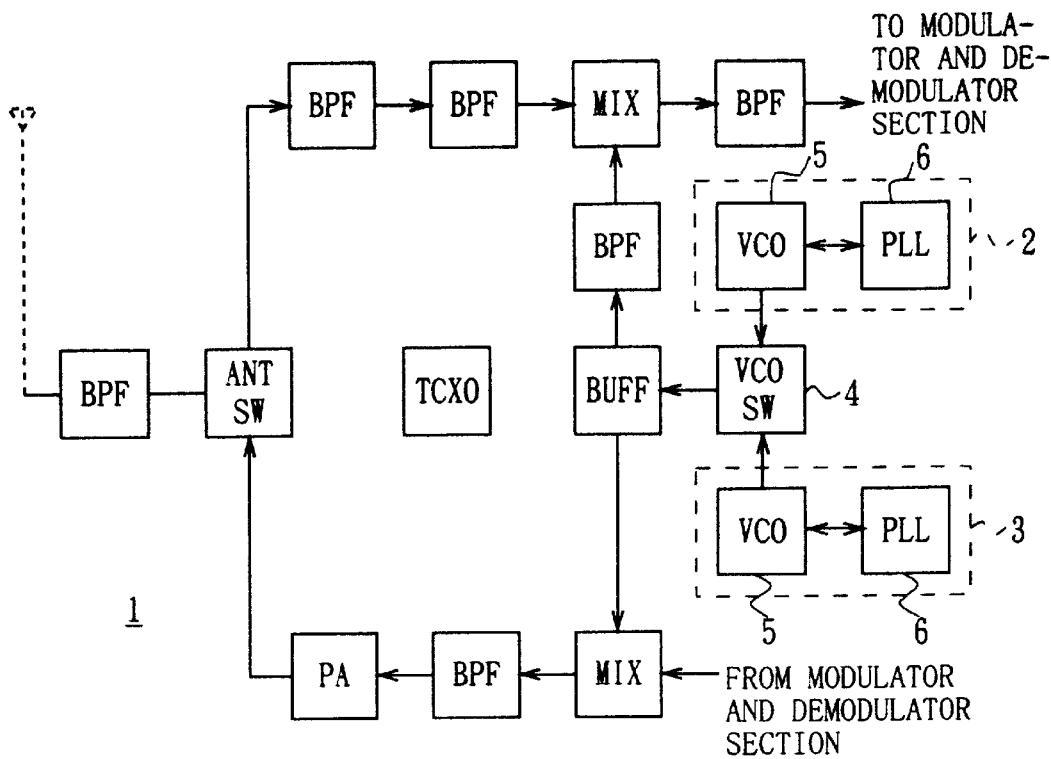
FIG. 3 is a block diagram showing a constitution of the radio section of the conventional base unit.
Figure 6:
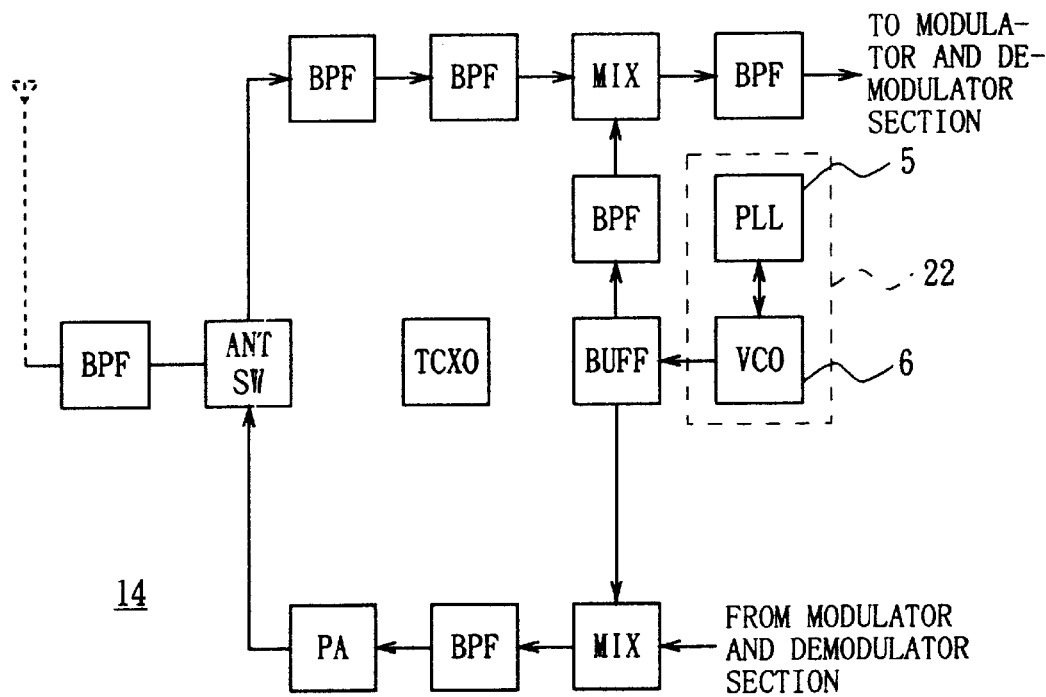
FIG. 6 is a block diagram showing a constitution of the radio section of the base unit of FIG. 5.

As shown in FIG. 6, in the radio section 14 of the base unit CS, a frequency-selecting oscillator is comprised of one frequency synthesizer 22 which has a PLL 5 and a voltage controlled oscillator 6. The radio section 14 uses the frequency synthesizer 22 for transmission along with reception. The radio section 14 shifts the oscillation frequency which is produced in the frequency synthesizer 22 with the stated frequency spacing, to produce the control carrier and the communication carrier.

The communication control section 16 controls the radio section 14 so as to cause it to transmit the control data using the control carrier in the stated transmission time slot, and calls up a portable unit PS. Besides, during the time of a reception waiting state, the communication control section 16 detects whether a connection-request signal has been transmitted from a portable units PS or not.

For example, in the case where a portable unit PS1 transmits the connection-request signal to request a talk with the base unit CS, the communication control section 16 transmits the control data by the use of the control carrier, and assigns the communication carrier, the time slot, and others to the calling-side portable unit PS1.

The base unit CS is thereby able to cause the portable unit PS1 to start the communication for talking with the base unit CS.

For example, in the case where a portable units PS2 transmits the connection-request signal to request a talk with the portable unit PS1, the communication control section 16 transmits the control data by the use of the control carrier, and assigns the communication carrier, the time slot, and others to the calling-side portable unit PS2.

The base unit CS is hereby able to cause the portable unit PS2 to start the communication for talking which is relayed by the base unit CS.

Following to this, the communication control section 16 transmits the control data the called-side portable unit PS1 by the use of the control carrier, and assigns the connection-request signal which indicates to start talking between portable units PS1, the communication carrier for a direct talk between portable units, the time slot, and others to a corresponding portable unit PS2.

The base unit CS is thereby able to start the communication for directly talking in one direction from the called-side portable unit PS1 to the calling-side portable unit PS2.

Figure 7:
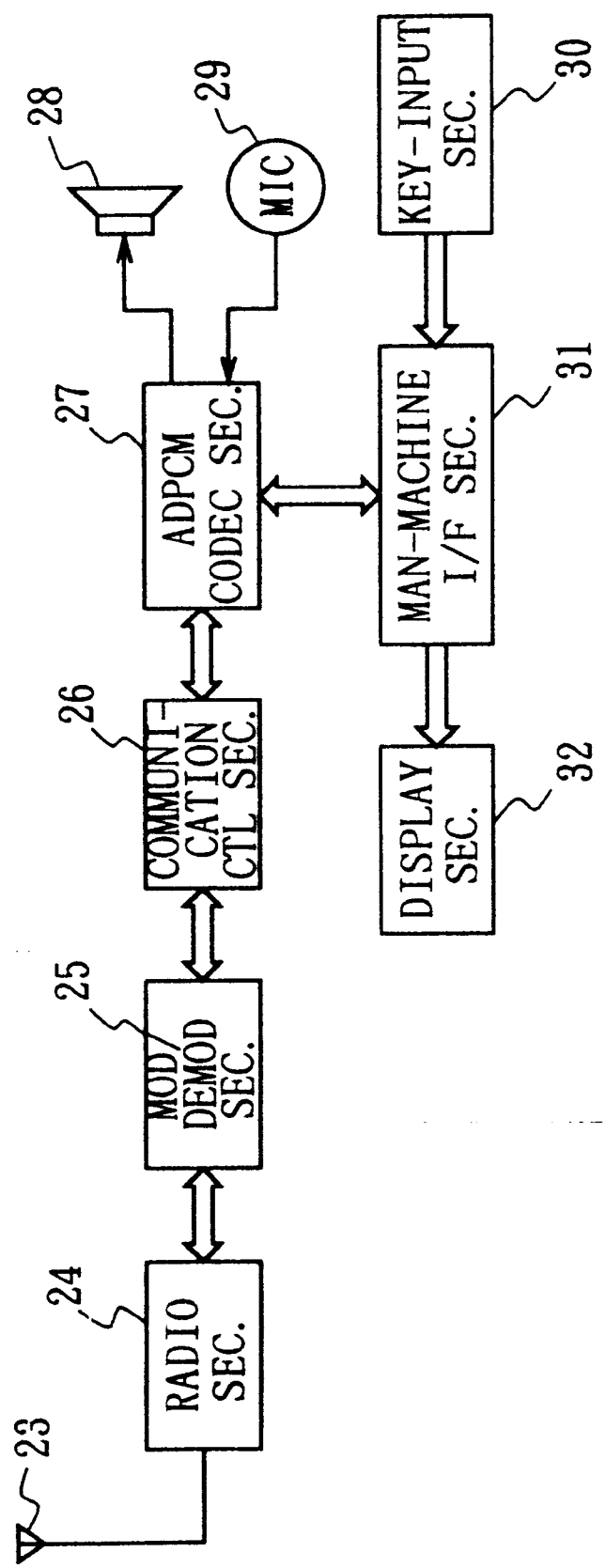
FIG. 7 is a block diagram showing a constitution of a portable unit which is used in the PHS-scheme digital codeless-phone system of the embodiment.

As shown in FIG. 7, one portable unit PS performs reception processing of the high-frequency signal which has been obtained by receiving the radio wave transmitted from the base unit CS or the other portable unit PS by the use of an antenna 23 in a radio section 24, and then supplies it to a modulator and demodulator 25 so as to demodulate the reception data. The modulator and demodulator 25 supplies the demodulated reception data to an ADPCM CODEC section 27, via a communication control section 26. The ADPCM CODEC section 27 produces an audio signal from the received ADPCM digital data, and then supplies this audio signal to a speaker 28 so as to cause it to output the voice.

The portable unit PS receives a voice with a microphone 29, and then supplies the audio signal which has been produced in the microphone 29 in response to the voice to the ADPCM CODEC section 27. The ADPCM CODEC section 27 converts this audio signal into an ADPCM digital data, and supplies this digital data to the modulator and demodulator 25 via the communication control section 26. The modulator and demodulator 25 produces a modulation signal which is responding to this digital data, and gives the modulation signal to the radio section 24. The radio section 24 modulates the communication carrier with this modulation signal to produce a modulated signal of high frequency, and then transmits this modulated signal from the antenna 23 in a wireless manner.

The portable unit PS gives the communication control section 26 the control information which have been produced in a key-input section 30 in response to the operation, via a man-machine interface section 31 and the ADPCM CODEC section 27. At this time, the man-machine interface section 31 displays the control information, the operational state, and others, on a display screen (not shown) of a display section 32.

At the time of a reception waiting state, the communication control section 26 controls the receive operation, and receives only the control data which has been transmitted from the base unit CS by the use of the control carrier intermittently with the stated spacing. Therefore, the portable unit PS is able to decrease the dissipation power of the reception waiting state.

The communication control section 26 discriminates the content of the received control data, and when it has been judged that it is being called with the connection-request signal which is included in the control data, it starts the communication for a talk.

In the case where calling is performed from the portable unit PS for the purpose of a line-wire talking or an intercommunication (toward the base unit CS and toward the portable unit PS), the communication control section 26 transmits the control data which includes the connection-request signal, and the individual number of the called-side portable unit PS or the telephone number of the line-wire side, to the base unit CS, using the control carrier.

In this connection, the transmission and reception of the control data is performed by the use of a physical slot for controlling. The transmission and reception of the voice data is performed by the use of a physical slot for communication. The physical slot for controlling and the physical slot for communication, which are shown in FIGS. 8A and 8B, are composed of 240 bits respectively, and transmitted in 625 [μs], that is a period of one time slot.

The physical slot for controlling is composed in such a manner that, for instance, the ramp bit R, the start symbol SS, the preamble PR, the unique word UW, the channel identification code CI, the incoming identification code, the outgoing identification code, the control data I, the error checking parity CRC, and the guard bit are sequentially placed into 4, 2, 62, 32, 4, 42, 28, 34, 16, and 16 bits respectively.

The physical slot for communication is composed in such a manner that, for instance, the ramp bit R, the start symbol SS, the preamble PR, the unique word UW, the channel identification code CI, the low-speed attached channel SACCH (denoted by SA, in the figure), the voice data TCH, the error checking parity CRC, and the guard bit are sequentially placed into 4, 2, 6, 16, 4, 16, 160, 16, and 16 bits respectively.

Now, an explanation is given of the operations of the base unit CS and the portable units PS1 and PS2 which are in such a state that the talking is being performed between portable units PS1 and PS2. As shown in FIG. 9C, the calling-side portable unit PS2 transmits a voice data to the base unit CS, using the communication carrier of the frequency ft, in the transmission time slot T3 of the period S27.

As shown in FIG. 9A, the base unit CS receives the voice data at the reception time slot R3 of the period S27, and transmits the voice data to the called-side portable unit PS1, using the communication carrier of the frequency ft, in the transmission time slot T3 of the period S31. As shown in FIG. 9B, the portable unit PS1 receives the voice data at the reception time slot R1 of the period S31, and simultaneously synchronizes the time slot with the time slot of the base unit CS. In this way, the voice data transmitted by the portable unit PS2 is sent to the portable unit PS1 via the base unit CS.

At this time, as shown in FIG. 9C, the portable unit PS2 receives, at the time slot R3 of the period S31, the down communication carrier of the frequency ft at the transmission time slot T3 of the period S31 in FIG. 9A.

Therefore, the portable unit PS2 is able to synchronize the time slot with the time slot of the base unit CS similar to the portable unit PS1.

On the other hand, as shown in FIG. 9B, the portable unit PS1 directly transmits the voice data to the portable unit PS2, using the communication carrier for a direct talk between portable units, at the transmission time slot T3 of the periods S21 and S29. As shown in FIG. 9C, the portable unit PS2 receives this voice data at the reception time slot R1 of the periods S21 and S29.

The portable units PS1 and PS2 receive the down communication carrier which is transmitted from the base unit CS at the same time, and synchronize the time slot, so that the portable unit PS2 uses the signal sent from the portable unit PS1 and does not need to synchronize the time slot. Therefore, the portable unit PS1 is able to directly transmit the voice data to the portable unit PS2.

In this way, the voice data sent via the base unit CS and the voice data directly sent to the portable unit PS2 are adjusted so that the portable units PS1 and PS2 can communicate in bi-direction.

Further, the portable units PS1 and PS2 which are busy receive the down communication carrier having the voice data transmitted via the base unit CS to synchronize with the base unit CS until the communication is ended, so as to easily correct a deviation of synchronism of the time slots.

In the above constitution, the base unit CS is merely required to use only one transmission time slot and reception time slot in each one frame (transmission time slot T3 and reception time slot R3), when it is permitting the portable units PS to talk bi-directionally by the above procedure.

At this point, as shown in FIG. 9A, such a case will be considered that the control carrier fc is used in the base unit CS at the transmission time slot T1 of the period S21 and the reception time slot R1 of the period S25.

In this case, a transmission time slot T2 which is not transmitted exists on the point between the transmission time slot T1 of the period S21 and the transmission time slot T3 of the period S23 of the base unit CS. Besides, a transmission time slot T4 which is not transmitted exists on the point between the transmission time slot T3 and the reception time slot R1 of the period S25. Besides, the reception time slot R2 which is not received exists on the point between the reception time slot R1 and the reception time slot R3 of the period S27. Besides, the reception time slot R4 which is not received and the transmission time slots T1 and T2 which are not transmitted exist on the point between the reception time slot R3 and the transmission time slot T3 of the period S31.

So, the base unit CS switches the oscillation frequency of the frequency synthesizer 22, at the time slots of the above-mentioned so-called free periods at which transmission or reception is not performed.

In fact, several tens of microsecond [$\mu$s] are enough to stabilize the oscillation frequency of the frequency synthesizer 22 into the frequency fc or ft, after it has been switched.

Therefore, the base unit CS is able to switch the oscillation frequency of the frequency synthesizer 22 and to stabilize the frequency within 625 [$\mu$s], that is, the period of a free time slot, at least one of which exists between the time slots which use the different frequencies, and able to wait the start of the time slot which uses the switched frequency, leaving a margin.

Accordingly, the base unit CS can transmit and receive the control data, by the use of the control carrier of the frequency fc which has been generated by switching the oscillation frequency of the frequency synthesizer 22, even in such a state that it is permitting to talk between the portable units PS1 and PS2 bi-directionally. As a result, the other portable units PS3 and PS4 of reception waiting state, excepting the portable units PS1 and PS2 which are talking with each other, are able to receive the control data which is using the control carrier from the base unit CS, and so they are laid within the speakable zone.

Besides, the control data can be transmitted and received by the control carrier even in such a state that the base unit CS relays the communication between the portable units PS1 and PS2, so that when a connection request has occurred which is based on a line-wire talking, an intercommunication, a door phone, etc., the base unit CS is able to easily inform the other portable units PS3 and PS4 of in the reception waiting state that the connection request has occurred. Besides, the base unit CS is required to merely switch the oscillation frequency of the single frequency-synthesizer 22, at the time of obtaining the control carrier and the communication carrier, in this way the constitution of the radio section 14 can be further simplified in comparison with the usual.

According to the above constitution, the voice data which transmitted from the calling-side portable unit PS2 out of the bi-directional communications between two portable units PS1 and PS2 is transmitted to the called-side portable unit PS1 via the base unit CS, and the voice data transmitted from the called-side portable unit PS1 is directly transmitted to the calling-side portable unit PS2. Thereby, the base unit CS is able to ensure the plural free time-slots which can be used for switching of the oscillation frequency of the frequency synthesizer 22 and for transmitting/receiving of the control data by the use of the control carrier of the frequency fc, in addition to the time slot for transmitting/receiving the voice data through the communication carrier of the frequency ft. Therefore, a radio section 14 of the base unit CS can be composed further simply, in which the radio section to relay the voice data sent from the portable units PS1 and PS2 by the communication carrier of the frequency ft, and to transmit/receive the control data to the portable units PS3 and PS4 of the reception waiting state through the control carrier of the frequency fc.

In the above embodiment, the description has been given of the case where a voice data sent from the calling-side portable unit PS2 is relayed at the base unit CS to supply it to the called-side portable unit PS1, and a voice data sent from the called-side portable unit PS1 is directly transmitted to the calling-side portable unit PS2. However, the present invention is not limited to this case but is also applicable to such a case that the voice data sent from the called-side mobile wireless terminal is relayed at a base station to supply it to the calling-side mobile wireless terminal, and the voice data sent from the calling-side mobile wireless terminal is directly transmitted to the called-side mobile wireless terminal. In this case, the same effect as the above case can be obtained.

Further, in the above embodiment, the description has been given of the case where a voice data sent from the calling-side portable unit PS2 is relayed by the base unit CS to transmit it, the relayed voice data is received at the calling-side and called side portable units PS2 and PS1 at the same time, and the calling-side and called-side portable units PS2 and PS1 are synchronized with the base unit in accordance with the timing of this reception. However, the present invention is not limited to this case, but also is applicable to the case where the voice data relayed by the base station is received at one mobile wireless terminal out of the calling-side and called-side mobile wireless terminals and one mobile wireless terminal is synchronized with the base station prior to the other terminal, thereafter, the voice data sent from one mobile wireless terminal is received by the other mobile wireless terminal and the other mobile wireless terminal is synchronized with the base station in accordance with the timing of this reception.

Further, in the above embodiment, the description has been given of the case where the communication is performed with the PHS scheme, however, the present invention is broadly applicable to a wireless telephone system wherein the communication is performed with TDMA scheme, and plural portable units are registered to the base unit, which is connected to the public telephone network, and used.

Further, in the above embodiment, the description has been given of the case where the transmission and reception is performed on the basis of setting of the time slots having the constant period and the physical slots having the constant number of bits, however we do not intend to limit the present invention to this case. So long as the base station ensures the free periods which isolate the first period from the second period which use the different frequencies each other, and the base station switches the oscillation frequency of the frequency-selecting oscillators during the free periods and stabilizes the frequencies, the duration of transmission and reception of the wireless telephone system and the number of bits which are transmitted and received during this duration may be constituted arbitrarily.

As described above, according to the present invention, a first data sent from a first mobile wireless terminal, out of the bi-directional communications between the first and second mobile wireless terminals, is relayed at a base station to transmit it to the second mobile wireless terminal, and a second data sent from the second mobile wireless terminal is directly transmitted to the first mobile wireless terminal. Thereby, the base station is able to ensure a free period which is allocated to switching of the oscillation frequency of the frequency-selecting oscillators, and to transmission and reception of the control data by the use of the second frequency, in addition to the period for transmitting and receiving the first data by the use of the first frequency. Accordingly, it is able to simplify the radio section of the base station for relaying the predetermined data sent from the mobile wireless terminal, and for transmitting/receiving the control data to mobile wireless terminals which are in a reception waiting state by means of a second frequency.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A method of operating a wireless telephone system of the time division multiple access scheme having base stations connected to a public telephone network and plural mobile wireless terminals for communicating with the base stations, comprising the steps of:

communicating a state data among said mobile wireless terminals, performing a bi-directional communication between a first mobile wireless terminal and a second mobile wireless terminal out of said plural mobile wireless terminals, causing said first mobile wireless terminal to transmit first data to said base station using a first frequency;

causing said base station to relay said first data transmitted from said first mobile wireless terminal and to transmit said first data to said second mobile wireless terminal using said first frequency; and causing said second mobile wireless terminal to transmit second data directly to said first mobile wireless terminal, wherein the base station transmits and receives control data to other mobile wireless terminals which are in a reception waiting state using a second frequency, even during the bi-directional communication between said first and second mobile wireless terminals, and wherein a free period is allocated to switching between the first and second frequencies.

2. The method of operating a wireless telephone system according to claim 1, wherein:

said first mobile wireless terminal transmits said first data at a first period;

said base station receives said first data transmitted from said first mobile wireless terminal at said first period, and transmits the first data at a second period not adjacent to said first period; and said second mobile wireless terminal transmits said second data at a third period not adjacent to said first and second periods.

3. The method of operating a wireless telephone system according to claim 2, wherein said base station transmits and receives control data at a fourth period not adjacent to said first, second, and third periods, and also at said third period.

4. The method of operating a wireless telephone system according to claim 3, wherein said first, second, third, and fourth periods correspond to one of a transmission time slot and a reception time slot of the time division multiple access scheme, and each successive frame of the time division multiple access scheme is composed of at least four pairs of the transmission time slot and the reception time slot.

5. The method of operating a wireless telephone system according to claim 1, wherein said first and second mobile wireless terminals synchronize with said base station in accordance with said first data relayed by said base station.

6. The method of operating a wireless telephone system according to claim 5, wherein said first and second mobile wireless terminals receive said relayed first data at a same time to synchronize with said base station.

7. The method of operating a wireless telephone system according to claim 5, wherein said second mobile wireless terminal receives said relayed first data to synchronize with said base station; and said first mobile wireless terminal receives said second data transmitted from said synchronized second mobile wireless terminal to synchronize with said base station in accordance with the second data.

8. The method of operating a wireless telephone system according to claim 5, wherein said first mobile wireless terminal receives said relayed first data to synchronize with said base station; and said second mobile wireless terminal receives said first data transmitted from said synchronized first mobile wireless terminal to synchronize with said base station in accordance with the first data.

* * * * *